United States Patent
Sogabe (10) Patent No.: US 11,296,492 B2
(45) Date of Patent: Apr. 5, 2022

(54) PROTECTION CIRCUIT, SEMICONDUCTOR DEVICE, AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Taku Sogabe, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/009,372

(22) Filed: Sep. 1, 2020

(65) Prior Publication Data

US 2021/0091554 A1    Mar. 25, 2021

(30) Foreign Application Priority Data

Sep. 19, 2019  (JP) .............. JP2019-170533

(51) Int. Cl.
   *H02H 5/04*    (2006.01)
   *H02H 3/20*    (2006.01)
   *H02H 1/00*    (2006.01)

(52) U.S. Cl.
   CPC ............ *H02H 5/04* (2013.01); *H02H 1/0007* (2013.01); *H02H 3/20* (2013.01)

(58) Field of Classification Search
   CPC ............ H02H 6/00; H02H 6/005; H02H 4/04; H02H 4/041; H03K 2017/0806
   See application file for complete search history.

(56) References Cited

U.S. PATENT DOCUMENTS 6,674,185 B2   1/2004  Mizuta
7,417,487 B2   8/2008  Mori
              (Continued)

FOREIGN PATENT DOCUMENTS

JP   2003149055 A    5/2003
JP   2006302977 A   11/2006
JP   2006317217 A   11/2006

OTHER PUBLICATIONS

Pfost, et al., "Accurate Temperature Measurements of DMOS Power Transistors up to Thermal Runaway by Small Embedded Sensors, IEEE Transactions on Semiconductor Manufacturing, vol. 25, No. 3, Aug. 2012".

*Primary Examiner* — Jared Fureman
*Assistant Examiner* — Christopher J Clark
(74) *Attorney, Agent, or Firm* — Holtz, Holtz & Volek PC (57) ABSTRACT

According to one embodiment, a protection circuit is a protection circuit for protecting an output driver element from overheat, and includes a measurer configured to measure, as a measurement value, a value proportional to a supply power amount to the output driver element, an estimator configured to estimate a temperature rise amount of the output driver element corresponding to the supply power amount, on a basis of the measurement value, a detector configured to detect an ambient temperature of the output driver element, and a determiner configured to determine whether a temperature obtained by adding the temperature rise amount estimated to the ambient temperature exceeds a predetermined threshold temperature, and to output a cutoff instruction signal for the output driver element.

7 Claims, 4 Drawing Sheets

(56) References Cited

U.S. PATENT DOCUMENTS

| | | | |
|---|---|---|---|
| 7,507,023 B2 | 3/2009 | Oyabe et al. | |
| 2010/0254059 A1* | 10/2010 | Higuchi | H02H 7/228 361/103 |
| 2016/0315464 A1* | 10/2016 | Furuto | H02H 5/04 |
| 2019/0165564 A1* | 5/2019 | Fuseya | B60R 16/023 |

* cited by examiner

PROTECTION CIRCUIT, SEMICONDUCTOR DEVICE, AND METHOD

CROSS-REFERENCE TO RELATED APPLICATIONS

This application is based upon and claims the benefit of priority from Japanese Application No. 2019-170533, filed on Sep. 19, 2019, the entire contents of which are incorporated herein by reference.

FIELD

An embodiment of the present invention described herein relates generally to a protection circuit, a semiconductor device, and a method.

BACKGROUND

Conventionally, in order to thermally protect an output driver element (for example, a driver transistor element at an output stage, or the like), temperature measurement by a temperature sensor is required (for example, see Japanese Patent Application Laid-open No. 2006-317217, Japanese Patent Application Laid-open No. 2003-149055, and Japanese Patent Application Laid-open No. 2003-149055).

The temperature sensor is desired to be arranged near the output driver element to perform accurate temperature measurement. However, such an arrangement may be difficult in some cases, depending on the device structure.

In order to avoid the difficulty described above, it is conceivable to use a method of estimating the temperature of the output driver element. However, in general, when protection is required, there are many cases where an abnormality is present in relation to the power supply, the load, and/or the like. Thus, a problem arises in that it is difficult to conduct design on the assumption that the heat generation amount of the output driver element is constant.

Further, a method has been proposed in which a temperature sensor is embedded inside an output element to measure the temperature at its central portion. In this method, for example, an electric current is caused to flow by using a parasitic NPN element existing in a DMOS element, and a temperature is measured by measuring a voltage of the PN junction between its base and emitter. However, the temperature sensor requires diffusion regions, contacts, and interconnection lines additionally in the output DMOS element. If there is non-uniformity caused in a diffusion region at the periphery, a contact position, and/or an interconnection line, destruction may occur due to local breakdown in the DMOS and/or electromigration in the interconnection line.

The present invention has been made in consideration of the above, and has an object to provide a protection circuit, a semiconductor device, and a method that can accurately detect the temperature of an output driver element by using a simple structure, and can more reliably protect the output driver element and further a semiconductor device (semiconductor chip) on which this output driver element is mounted, when an abnormality is detected.

DETAILED DESCRIPTION

In general, according to one embodiment, a protection circuit is a protection circuit for protecting an output driver element from overheat, and includes a measurer configured to measure, as a measurement value, a value proportional to a supply power amount to the output driver element, an estimator configured to estimate a temperature rise amount of the output driver element corresponding to the supply power amount, on a basis of the measurement value, a detector configured to detect an ambient temperature of the output driver element, and a determiner configured to determine whether a temperature obtained by adding the temperature rise amount estimated to the ambient temperature exceeds a predetermined threshold temperature, and to output a cutoff instruction signal for the output driver element.

Figure 1:
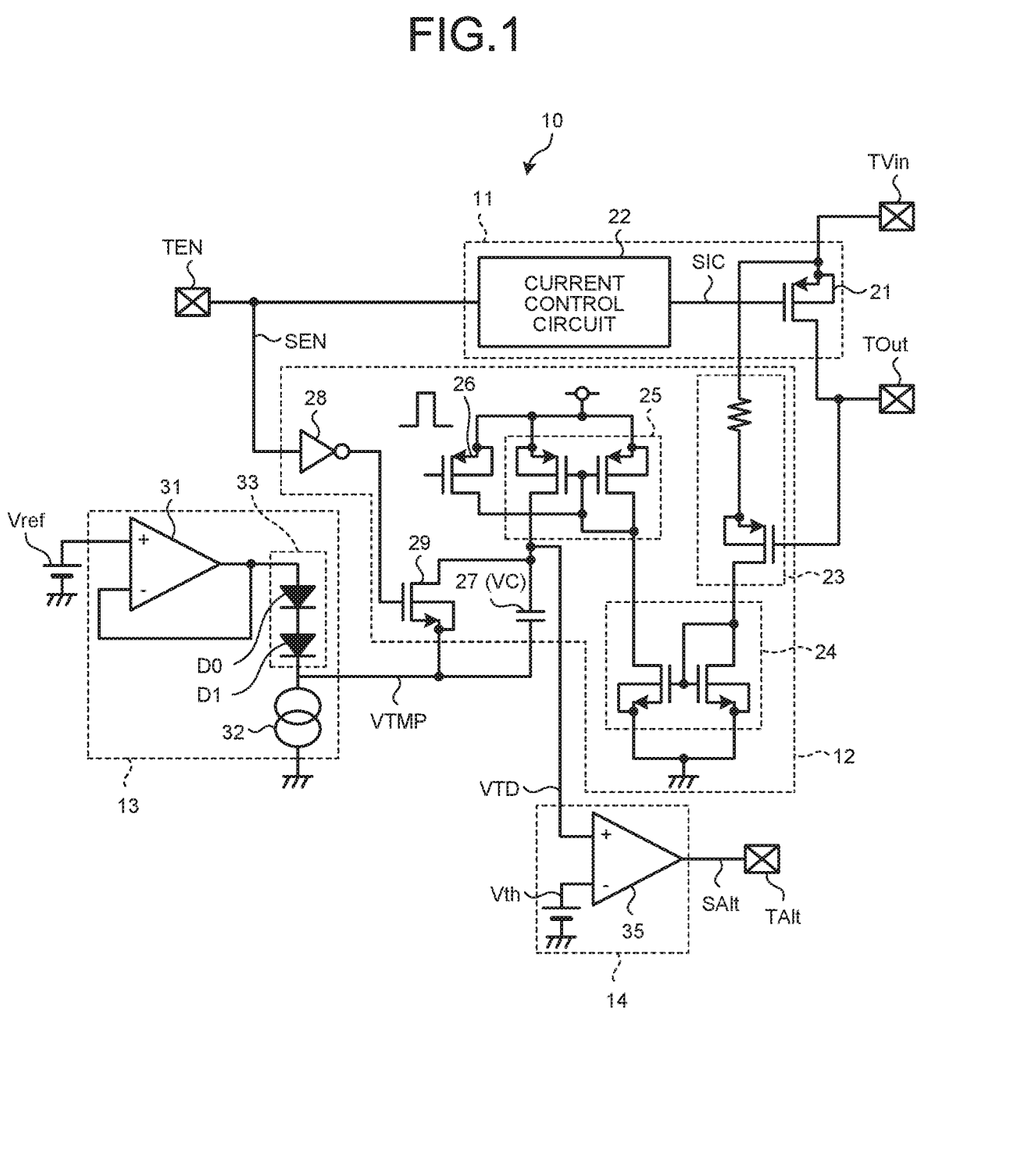
FIG. 1 is a configuration diagram of a current driver circuit including a protection circuit according to an embodiment.

An exemplary embodiment will be explained below in detail with reference to the accompanying drawings. FIG. 1 is a configuration diagram of a current driver circuit including a protection circuit according to an embodiment.

The current driver circuit 10 includes an output driver 11, an input/output voltage difference detector 12, a chip temperature detector 13, and an overheat sensor 14. Here, the input/output voltage difference detector 12 functions as a measurer. The chip temperature detector 13 functions as a detector. The overheat sensor 14 functions as a determiner.

The output driver 11 includes a driver transistor 21 formed as a P-channel MOS transistor and a current control circuit 22 that outputs a current control signal SIC. In the driver transistor 21, its source terminal is connected to a power supply input terminal TVin, the drain terminal is connected to an output terminal TOut, and the gate terminal is supplied with the current control signal SIC.

The input/output voltage difference detector 12 measures a value proportional to the supply power amount to an output driver element. The input/output voltage difference detector 12 includes a voltage/current converter 23, a first current mirror circuit 24, a second current mirror circuit 25, a current mirror control transistor 26, a capacitor 27, an inverter 28, and a discharge transistor 29.

The voltage/current converter 23 converts the voltage difference between the power supply input terminal TVin and the output terminal TOut (which will be referred to as "input/output voltage difference", hereinafter) into an electric current.

The current mirror control transistor 26 is connected to the second current mirror circuit 25 in parallel therewith. The current mirror control transistor 26 controls the operation of the second current mirror circuit 25, on the basis of a pulse control signal input therein. The capacitor 27 accumulates electric charges by an output current from the second current mirror circuit 25, when the current mirror control transistor 26 is in an off-state (opened state). The voltage of accumulated electricity of the capacitor 27 is proportional to the temperature rise amount of the output driver element. The inverter 28 inverts an enable signal SEN, which has been input through an enable signal terminal TEN, and then outputs this signal.

The discharge transistor 29 causes the capacitor 27 to discharge (perform electric discharge) when the enable signal SEN is in a disabled state, on the basis of the output of the inverter 28.

The chip temperature detector 13 detects the ambient temperature of the output driver element. The chip temperature detector 13 includes an amplifier 31, a constant current source 32, and a diode unit 33 for chip temperature detection.

The amplifier 31 detects the temperature around the semiconductor chip that is a semiconductor device, and amplifies the voltage of a reference voltage Vref having a small temperature characteristic.

In the constant current source 32, its one end serves as the high potential side terminal and is connected to the low potential side terminal of the capacitor 27, and the other end is grounded.

In the diode unit 33, its anode terminal is connected to the output terminal of the amplifier 31, and the cathode terminal is connected to the constant current source 32. The diode unit 33 includes one or more diodes (two diodes D0 and D1 in the example of FIG. 1), and outputs an output voltage VTMP which is given by a drop of the forward drop voltage Vf of the diodes.

Here, the output voltage VTMP is proportional to the ambient temperature of the output driver element. Further, the diode unit 33 functions as a reference temperature measurer when the output driver 11 is not in operation. For this reason, the diode unit 33 is arranged in a place that is not easily affected by heat generation of the output driver 11 in operation.

Figure 2:
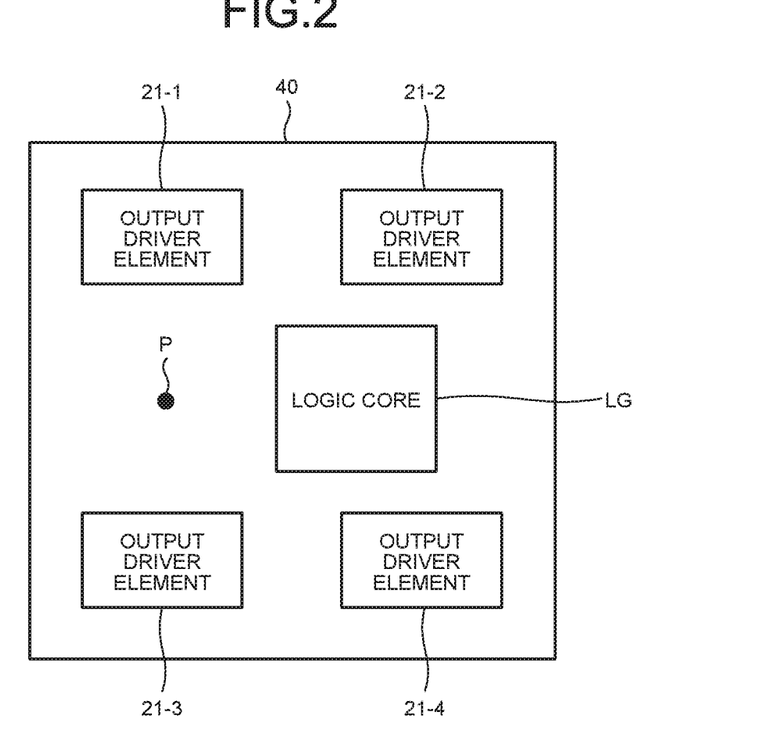
FIG. 2 is an explanatory diagram of an arrangement example of a diode unit 33 for detecting a chip temperature.

FIG. 2 is an explanatory diagram of an arrangement example of the diode unit 33.

For example, in a case where a semiconductor chip 40 is provided with four driver transistors 21-1 to 21-4 and one logic circuit LG arranged thereon, the diode unit 33 is arranged at a position P that is not easily affected by heat generation of each of the four driver transistors 21-1 to 21-4. Here, although not illustrated, a protection circuit is provided for each of the driver transistors 21-1 to 21-4.

The forward drop voltage of the diodes composing the diode unit 33 shows a substantially linear temperature characteristic. Accordingly, the voltage of the low potential side terminal of the capacitor 27 becomes a voltage linear with respect to the ambient temperature (for example, chip temperature) detected by the diode unit 33.

When the ambient temperature exceeds a predetermined temperature, the overheat sensor 14 outputs a cutoff instruction signal for the output driver element. The overheat sensor 14 includes a comparator 35. The comparator 35 compares a voltage VTD obtained by adding the voltage of the capacitor 27 to the output voltage VTMP with a threshold voltage Vth, and outputs an overheat sensing signal SAlt from an overheat sensing terminal TAlt. When the voltage VTD is higher than the threshold voltage Vth, the comparator 35 senses that this means an overheat state, and outputs the overheat sensing signal SAlt at an "H" level.

Specifically, on the basis of whether the sum of the voltage VC (first voltage) of the capacitor 27 and the output voltage VTMP (second voltage) exceeds the predetermined threshold voltage Vth, the comparator 35 determines whether a temperature obtained by adding an estimated temperature rise amount to the ambient temperature exceeds a predetermined threshold temperature. As a result of this determination, when the temperature exceeds the predetermined threshold temperature, the comparator 35 outputs the overheat sensing signal SAlt at the "H" level.

Next, prior to describing an operation according to the embodiment, an explanation will be given of a conventional problem.

In order to thermally protect an output driver element, such as the driver transistor 21 described above, temperature measurement by a temperature sensor is required.

Incidentally, the temperature sensor measures not only the temperature of the entire chip provided with the output driver element but also the influence of heat generation of the output driver element itself. Thus, the temperature sensor is desired to be placed as close as possible to the output driver element.

However, if the temperature measurable by the temperature sensor is significantly different from the central temperature of the output driver element, or is greatly affected by heat generation of another element nearby, accurate temperature measurement cannot be performed.

Figure 3:
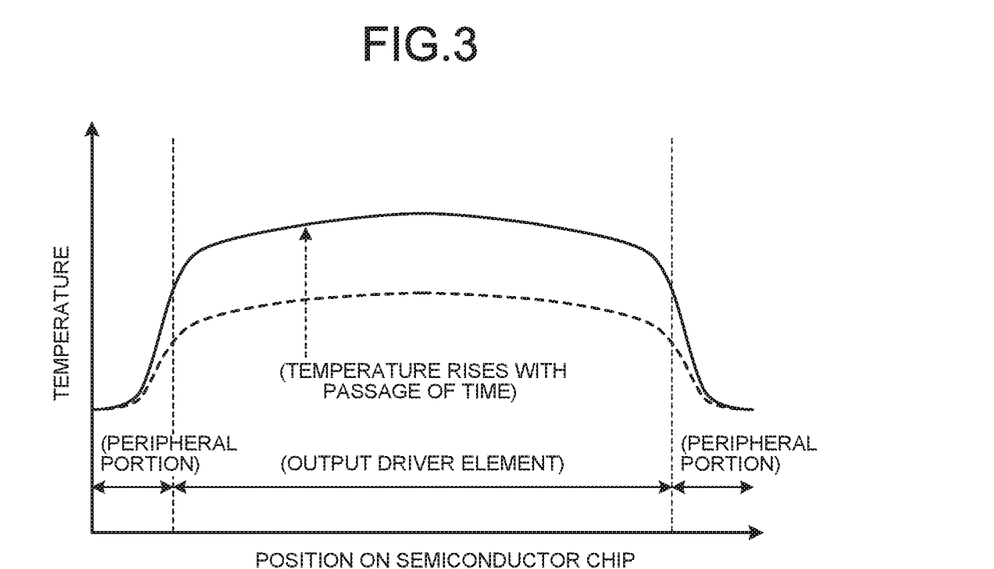
FIG. 3 is a schematic diagram of the temperature of an output driver element and around this element, in a case where the heat generation amount is large and the heat generation time is short.

FIG. 3 is a schematic diagram of the temperature of an output driver element and around this element, in a case where the heat generation amount is large and the heat generation time is short.

In FIG. 3, it can be seen that the temperature at the center of the output driver element is the highest, and the temperature at the periphery of the output element is much lower as compared with the inside because there is no heat generation at the periphery.

Accordingly, the temperature at the central portion of the output driver element is crucial in terms of thermal destruction of the output driver element. However, by using a temperature sensor arranged around the output driver element, the central temperature of the output driver element cannot be accurately measured. In this case, it becomes impossible to correctly estimate thermal destruction of the output driver element. Further, the same problem arises where several output driver elements are arranged side by side.

Further, if the heat generation amount of the output driver element is constant, it is conceivable to use a method of obtaining in advance the correlation between the temperature sensor and the central temperature by thermal simulation or the like, so as to estimate the central temperature and thereby protect the output driver element. However, in general, when protection is required, there are many cases where an abnormality is present in relation to the power supply, the load, and/or the like. Thus, it is difficult to conduct design on the assumption that the heat generation amount of the output driver element is constant.

Further, in order to make the protection possible even if a certain degree of error is permitted, it is necessary, in consideration of the error, to increase the area of the output driver element and thereby to increase the thermal margin. On the other hand, the difference between the ambient temperature and the central temperature increases as the area of the output driver element is larger. Thus, the temperature measurement becomes more inaccurate, as the output driver element is larger in influence on the chip area and larger in heat generation amount. In addition, the area of the output driver element is further increased Incidentally, it is known that the heat generation amount of the output driver element is proportional to the supply power amount, i.e., the amount of electric power supplied, to the output driver element. Accordingly, it is considered that, if the supply power amount to the output driver element can be accurately measured, the heat generation amount of the output driver element can be accurately estimated, and the (central) temperature of the output driver element can also be accurately estimated.

In consideration of the above, this embodiment is arranged to accurately measure the supply power amount to the output driver element, and thereby to accurately estimate the (central) temperature of the output driver element. Consequently, it is achieved to protect the output driver element and further a semiconductor device on which this output driver element is mounted.

Next, an explanation will be given of an operation according to the embodiment.

Where the enable signal SEN is in a disabled state ("L" level):

The output of the inverter 28 becomes an "H" level, and the discharge transistor 29 is set in an ON-state (closed state).

As a result, the capacitor 27 is set in a discharge state.

Further, the current control circuit 22 also comes into an inactive state, and the driver transistor 21 is set in an off-state (opened state), so that no voltage is output to the output terminal TOut.

Where the enable signal SEN is in an enabled state ("H" level):

The output of the inverter 28 becomes an "L" level, and the discharge transistor 29 is set in an off-state.

As a result, the capacitor 27 is set in a state capable of accumulating electricity.

Further, the current control circuit 22 also comes into an active state, and thus outputs the current control signal SIC to the gate terminal of the driver transistor 21.

Thus, the driver transistor 21 causes an electric current according to the voltage of the current control signal SIC to flow between the source and drain, so that the current according to the voltage of the current control signal SIC is output to the output terminal TOut.

The voltage/current converter 23 converts the input/output voltage difference into an electric current, and outputs this current to the first current mirror circuit 24.

Consequently, the current corresponding to the input/output voltage difference is duplicated and passed to the second current mirror circuit 25.

The second current mirror circuit 25 further duplicates the current duplicated by the first current mirror circuit 24, outputs this current as a detection current to the capacitor 27.

At this time, the current mirror control transistor 26 is in a state with a pulse control signal input therein. Only during a period in which the pulse control signal is at an "H" level, the second current mirror circuit 25 is in operation.

Accordingly, the capacitor 27 accumulates electricity by the output current of the second current mirror circuit 25, i.e., the current corresponding to the input/output voltage difference, only during the period in which the pulse control signal is at the "H" level.

In this case, as the pulse control signal is a signal having a constant cycle, the capacitor 27 accumulates electric charges proportional to the input/output voltage difference at a ratio corresponding to the on-duty.

Accordingly, as compared with a case where electric charges are always accumulated, it is possible to integrate the input/output voltage difference by using the capacitor 27 that has a small capacity.

Here, the input/output voltage difference has a value proportional to the heat generation amount of the driver transistor 21. Thus, the capacitor 27 accumulates electric charges proportional to the heat generation amount of the driver transistor 21, and comes to have a voltage corresponding thereto.

Accordingly, the voltage VC of the capacitor 27 is a value proportional to a temperature rise amount entailed by driving of the driver transistor 21.

On the other hand, the forward drop voltage of the plurality of diodes composing the diode unit 33 shows a substantially linear temperature characteristic. Accordingly, the voltage VTMP of the low potential side terminal of the capacitor 27 becomes a voltage linear with respect to the ambient temperature (for example, chip temperature) detected by the diode unit 33.

Thus, the voltage of the high potential side terminal of the capacitor 27, i.e., the voltage to be applied to the non-inversion input terminal of the comparator 35, becomes a voltage VTD (=VTMP+VC) that has a voltage obtained by adding the temperature rise amount due to the operation of the driver transistor 21 to the ambient temperature.

Here, an explanation will be given of a specific example of the voltage to be applied to the non-inversion input terminal of the comparator 35.

Figure 4A:
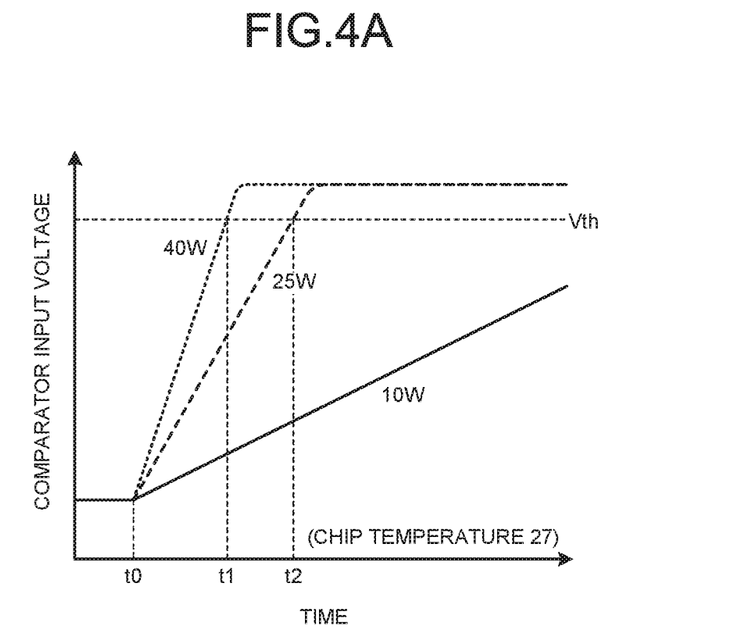
FIGS. 4A and 4B are diagrams each for explaining a change in the input voltage of a comparator, in a case where the temperature of a semiconductor chip as the ambient temperature is set constant and the input power amount of the output driver element is changed.
Figure 4B:
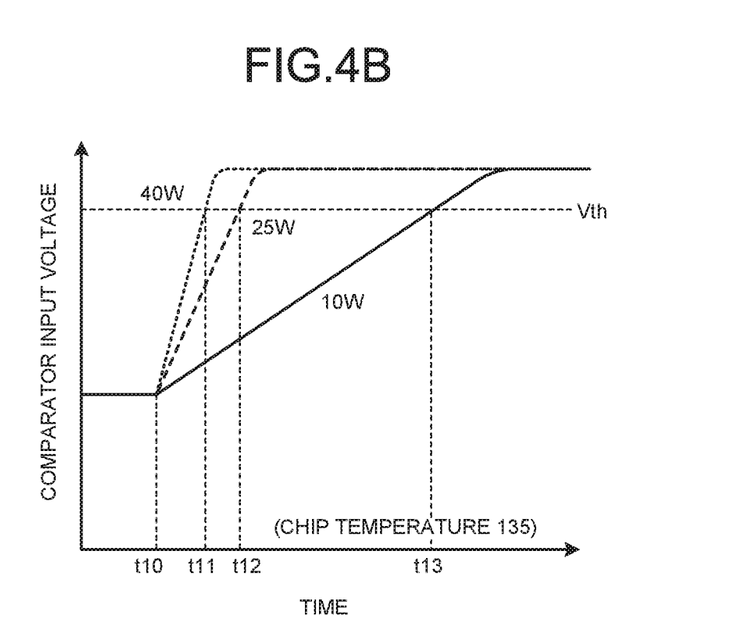

FIGS. 4A and 4B are diagrams each for explaining a change in the input voltage of the comparator, in a case where the temperature of the semiconductor chip as the ambient temperature is set constant and the input power amount of the output driver element is changed. Each of FIGS. 4A and 4B illustrates a change in the input voltage of the comparator, while the supply power of the driver transistor 21 is set to 10 W, 25 W, and 40 W.

FIG. 4A is a diagram for explaining a change in the input voltage of the comparator, in a case where the temperature of the semiconductor chip is set to 27° C. Where the supply power is 40 W, from a time point t0, the input voltage of the driver transistor 21, i.e., the predicted temperature of the driver transistor 21, rises rapidly, and exceeds the threshold voltage Vth at a time point t1.

Further, also where the supply power is 25 W, the predicted temperature of the driver transistor 21 rises rapidly, and the input voltage exceeds the threshold voltage Vth at a time point t2 (>t1). Where the supply power is 10 W, the input voltage does not exceed the threshold voltage Vth.

FIG. 4B is a diagram for explaining a change in the input voltage of the comparator, in a case where the temperature of the semiconductor chip is set to 135° C. Where the supply power is 40 W, from a time point t10, the input voltage of the driver transistor 21, i.e., the predicted temperature of the driver transistor 21, rises more rapidly than the case where the temperature of the semiconductor chip is set to 27° C., and exceeds the threshold voltage Vth at a time point t11 (<the time point t1).

Further, also where the supply power is 25 W, the predicted temperature of the driver transistor 21 rises rapidly, and the input voltage exceeds the threshold voltage Vth at a time point t12 (t2>t12>t11). Further, also where the supply power is 10 W, the predicted temperature of the driver transistor 21 rises rapidly, and the input voltage exceeds the threshold voltage Vth at a time point t13 (>t12>t11).

As described above, it can be seen that, as the ambient temperature is higher, and the supply power is larger, the temperature of the driver transistor 21 rises more rapidly.

Thus, at the input of the comparator 35, a voltage is generated that is obtained by adding a temperature rise amount corresponding to a heat generation amount generated in the output driver element to the ambient temperature (chip temperature). On the basis of the above, the central temperature of the output driver element can be estimated. Accordingly, by suitably setting the threshold voltage Vth, it is possible to perform control to cut off the output of the driver transistor 21 before thermal destruction occurs thereon.

Then, the comparator 35 compares the voltage VTD with the threshold voltage Vth. When the voltage VTD is larger than the threshold voltage Vth, the comparator 35 outputs the overheat sensing signal SAlt at the "H" level to indicate that the output driver element is in an overheat state.

Then, when the overheat sensing signal SAlt at the "H" level is output, the enable signal SEN is turned into a disabled state, for example, so that protection control can be performed to cut off the output of the driver transistor 21 before thermal destruction occurs thereon. As a result, it becomes possible to prevent the entire chip from falling into its thermal destruction.

Figure 5:
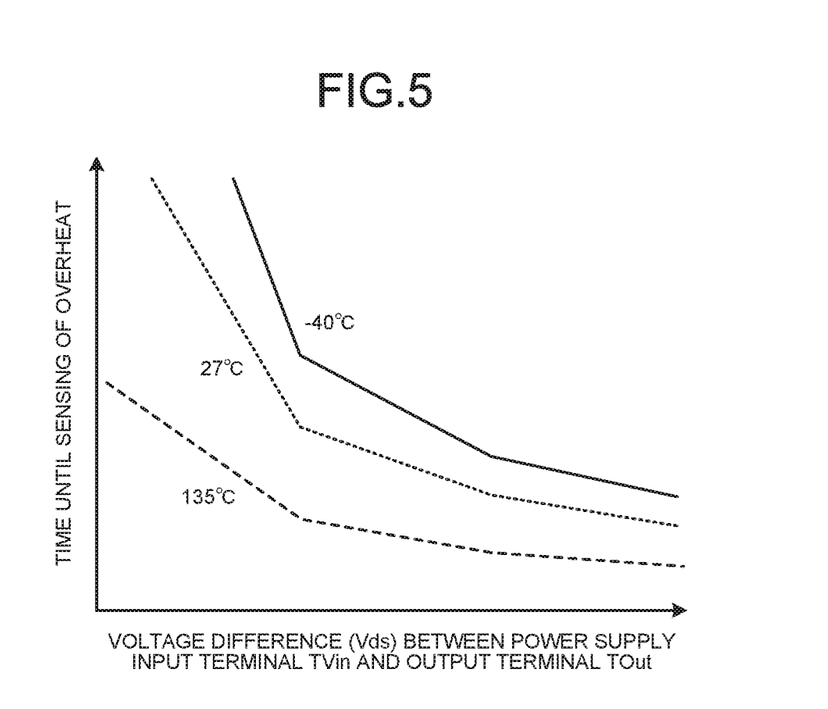
FIG. 5 is a diagram for explaining the relationship of the input/output voltage difference (Vds) between a power supply input terminal TVin and an output terminal TOut with the time until sensing of an overheat state.

FIG. 5 is a diagram for explaining the relationship of the input/output voltage difference (Vds) between the power supply input terminal TVin and the output terminal TOut with the time until sensing of an overheat state.

Here, it can be seen that, as the ambient temperature is higher, the time becomes shorter until sensing of an overheat state to output the overheat sensing signal SAlt at the "H" level.

Further, the relationship of the input/output voltage difference with the time until sensing of an overheat state is approximate to the curve of the safe operating area (SOA) of the transistor, which is obtained by calculation. Thus, it has been proved that this relationship is highly practical.

On the other hand, when the voltage VTD is the threshold voltage Vth or less, the comparator 35 outputs the overheat sensing signal SAlt at an "L" level to indicate that the output driver element is in a non-overheat state.

Then, when the overheat sensing signal SAlt at the "L" level is output, even if the output of the driver transistor 21 is continued, thermal destruction will never occur thereon. Thus, the driving control can be performed with confidence.

As described above, according to this embodiment, the central temperature of the driver transistor 21 can be easily estimated. Accordingly, by suitably setting the threshold voltage Vth of the comparator 35, the overheat sensing signal SAlt indicating an overheat state can be output with better timing. Thus, it is possible to stop the output of the driver transistor 21 to protect the driver transistor 21 and further the semiconductor chip (semiconductor device).

Further, where this embodiment is applied to an actual output driver element (driver transistor), adjustment can be made in accordance with a calculation result on the safe operating area of the transistor, which changes depending on the size of the output driver element, the use process, and so forth.

While some embodiments of the invention have been described, these embodiments are merely examples, and are not intended to limit the scope of the invention. These novel embodiments may be implemented in various other forms, and various omissions, replacements, and modifications may be made without departing from the scope and spirit of the invention. These embodiments and the modifications are included in the scope and spirit of the invention, and are included in the invention described in the claims and their equivalents.

What is claimed is:

1. A protection circuit for protecting an output driver element from overheat, the protection circuit comprising:

a measurer configured to measure, as a measurement value, a value proportional to a supply power amount to the output driver element;

an estimator configured to estimate a temperature rise amount of the output driver element corresponding to the supply power amount, based on the measurement value;

a detector configured to detect an ambient temperature of the output driver element; and a determiner configured to determine whether a temperature obtained by adding the estimated temperature rise amount to the ambient temperature exceeds a predetermined threshold temperature, and to output a cutoff instruction signal for the output driver element, wherein the estimator includes:

a voltage/current converter configured to convert a difference between an input voltage and an output voltage of the output driver element into an electric current; and a capacitor configured to be supplied with the electric current obtained by conversion and to hold a voltage proportional to the temperature rise amount of the output driver element.

2. The protection circuit according to claim 1, wherein the output driver element is a constant current supply element, and the difference between the input voltage and the output voltage of the output driver element is used as the value proportional to the supply power amount.

3. The protection circuit according to claim 1, wherein:

the estimator is configured to detect, as a first voltage, the voltage proportional to the temperature rise amount, the detector is configured to detect a second voltage proportional to the ambient temperature, and the determiner is configured to determine whether the temperature obtained by adding the estimated temperature rise amount to the ambient temperature exceeds the predetermined threshold temperature, based on whether a sum of the first voltage and the second voltage exceeds a predetermined threshold voltage.

4. A semiconductor device comprising:

one or more output driver elements;

a measurer configured to measure, as a measurement value, a value proportional to a supply power amount to each of the output driver elements;

an estimator configured to estimate a temperature rise amount of each of the output driver elements corresponding to the supply power amount, based on the measurement value;

a detector configured to detect an ambient temperature of each of the output driver elements; and a determiner configured to determine whether a temperature obtained by adding the estimated temperature rise amount to the ambient temperature exceeds a predetermined threshold temperature, and to output a cutoff instruction signal for each of the output driver elements, wherein the estimator includes:
a voltage/current converter configured to convert a difference between an input voltage and an output voltage of the output driver element into an electric current; and
a capacitor configured to be supplied with the electric current obtained by conversion and to hold a voltage proportional to the temperature rise amount of the output driver element.

5. A protection method to be executed in a semiconductor device including one or more output driver elements, to protect the output driver elements from overheat, the protection method comprising:
measuring, as a measurement value, a value proportional to a supply power amount to each of the output driver elements;
estimating a temperature rise amount of each of the output driver elements corresponding to the supply power amount, based on the measurement value;
detecting an ambient temperature of each of the output driver elements; and
determining whether a temperature obtained by adding the estimated temperature rise amount to the detected ambient temperature exceeds a predetermined threshold temperature, and outputting a cutoff instruction signal for the output driver element, wherein:
the semiconductor device further includes a capacitor, and
the estimating includes converting a difference between an input voltage and an output voltage of each of the output driver elements into an electric current, and holding, in the capacitor, a voltage proportional to the temperature rise amount of each of the output driver elements, based on the electric current obtained by conversion.

6. The method according to claim 5, wherein each of the output driver elements is a constant current supply element, and the difference between the input voltage and the output voltage of each of the output driver elements is used as the value proportional to the supply power amount.

7. The method according to claim 5, wherein:
the estimating includes detecting, as a first voltage, the voltage proportional to the temperature rise amount,
the detecting includes detecting a second voltage proportional to the ambient temperature, and
the determining includes determining whether the temperature obtained by adding the estimated temperature rise amount to the ambient temperature exceeds the predetermined threshold temperature, based on whether a sum of the first voltage and the second voltage exceeds a predetermined threshold voltage.

* * * * *